United States Patent [19]
Attaluri et al.

[11] Patent Number: 5,897,634
[45] Date of Patent: Apr. 27, 1999

[54] OPTIMIZED CACHING OF SQL DATA IN AN OBJECT SERVER SYSTEM

[75] Inventors: Gopi Krishna Attaluri, Santa Clara; Catalina Y. Fan, Cupertino; Gerald A. Fisher, San Jose; Robert Dean Jackson, Murphys; Harry Rohidas Nayak; David J. Wisneski, both of Morgan Hill, all of Calif.

[73] Assignee: International Business Machines Corporation, Armonk, N.Y.

[21] Appl. No.: 08/853,270

[22] Filed: May 9, 1997

[51] Int. Cl.[6] ...................................................... G06F 17/30
[52] U.S. Cl. .............................. 707/8; 707/10; 707/103; 707/104; 711/113; 711/118; 711/121
[58] Field of Search .................. 707/8, 10, 103, 707/104; 711/113, 118, 121

[56] References Cited

U.S. PATENT DOCUMENTS

| | | | |
|---|---|---|---|
| 4,930,071 | 5/1990 | Tou et al. | 707/4 |
| 5,261,069 | 11/1993 | Wilkinson et al. | 711/145 |
| 5,426,747 | 6/1995 | Weinreb et al. | 711/203 |
| 5,448,727 | 9/1995 | Annevelink | 707/101 |
| 5,574,902 | 11/1996 | Josten et al. | 707/1 |
| 5,596,754 | 1/1997 | Lomet | 395/726 |
| 5,615,362 | 3/1997 | Jensen et al. | 707/103 |
| 5,694,598 | 12/1997 | Durand et al. | 707/103 |
| 5,706,506 | 1/1998 | Jensen et al. | 707/103 |
| 5,751,958 | 5/1998 | Zweben et al. | 395/200.34 |

OTHER PUBLICATIONS

Molesky, Lory D., et al., "Database Locking Protocols for Large–Scale Cache–Coherent Shared Memory Multiprocessors: Design, Implementation and Performance", Department of Computer Science, University of Massachusetts, pp. 1–24, Jun. 6, 1995.

Keene, Christopher, "Building Better Performance: Distributed Applications Development With Persistence", http://www.persistence.com/persistence/pageTwo.pages/perform.html (obtained from the World Wide Web).

"DB2 Administration Guide", DB2 Product & Service Technical Library, http://www.software.ibm.com/data/db2/support/sqld00aa/sqld00103.html#HDRRMALOC (obtained from the World Wide Web).

*Primary Examiner*—Paul R. Lintz
*Attorney, Agent, or Firm*—Merchant, Gould, Smith, Edell, Welter, & Schmidt

[57] ABSTRACT

A computer-implemented component broker series server for optimized caching of SQL data is implemented. In an object-oriented computer system, relational data from a relational database is cached in a data cache. The object-oriented computer system has a server that includes an instance manager and that is connected to at least one client. Objects that represent the relational data are created and managed under control of the instance manager. The relational data is stored in the data cache, which includes a virtual memory data cache for each client.

30 Claims, 5 Drawing Sheets

OPTIMIZED CACHING OF SQL DATA IN AN OBJECT SERVER SYSTEM

BACKGROUND OF THE INVENTION

1. Field of the Invention

This invention relates in general to object server systems, and in particular to optimized caching of Structured Query Language (SQL) data in an object server system.

2. Description of Related Art

Object server computer systems are composed of collections of objects. Some object server computer systems use a relational database to store the data associated with one or more of the objects. The data in the relational database is retrieved from the relational database, manipulated, and stored in the relational database through use of an object interface to the relational database.

One of two approaches is typically taken to read and write data from the relational database. A first approach requires that a developer creating an object also generate read and write methods as part of the object implementation for reading or writing the data from and to the relational database. With the second approach, the object server computer system provides a function that performs the data read and write operations when the user describes, in a declarative manner, how the data attributes of the object map to the relational database.

One problem common to either approach is optimizing the movement of multiple objects to and from the relational database. Another problem common to either approach is determining when to lock the relational database so that updates that occur through the object interface are done with data integrity without performing excessive locking at the relational database. Excessive locking of data may degrade relational database concurrency. This is a particular concern with object-oriented computer systems where application programs tend to create long running transactions.

Yet another common problem is directed to providing a system in which relational data is represented by objects and which runs in a multi-threaded, multi-user object server environment.

Some computer systems that attempt to solve some of the problems mentioned above are: Sparky, which is written in SmallTalk by the International Business Machines (IBM) Object Technology Practices; Persistence, which is from Persistence Software; Java Relational Binding by O2 Technology; and DBConnect written jointly by IBM Santa Teresa Laboratory and Object Design, Inc. These computer systems map relational data to objects.

Some of the computer systems provide use of prefetch (i.e., preload options). Under a prefetch option, when data for an object is read from a relational database, data is also read for related objects for which there is a high likelihood of access. To read data for related objects, SQL SELECT and JOIN operations are used. The use of SQL SELECT and JOIN operations results in a more efficient access to a relational database than a series of individual SELECT statements to retrieve data for multiple objects.

Some of the computer systems implement pessimistic caching where data is read from the relational database during each transaction and the data remains locked in the relational database until the end of the transaction. If the data is needed by the next transaction, the data is reread from the relational database.

Other computer systems allow optimistic caching where data is unlocked at the relational database and remains in memory at the object server and can be reused by multiple transactions without rereading it from the relational database. A developer issues explicit refresh calls when the developer needs current data.

Some of the computer systems provide solutions that are designed to work in a client desktop environment where the client is connected directly to a relational database server. Other approaches make use of an object server (sometimes called tier 2 in a 3 tiered system) that is placed between the client and the relational database. This allows the object-oriented application program to execute at the object server and have a thin client.

Some of the approaches above do not track updated objects. When the object developer makes an update to an object, additional calls are required to apply the update to the relational database.

Moreover, when running in a multi-threaded, multi-user object server environment, the approaches above require that data be locked either at the database level or within the object server for serialization and data integrity. Use of such locks in a long running transaction can degrade system concurrency.

There is a need in the art for improved relational database access in a multi-threaded, multi-user object server environment.

SUMMARY OF THE INVENTION

To overcome the limitations in the prior art described above, and to overcome other limitations that will become apparent upon reading and understanding the present specification, the present invention discloses a method, apparatus, and article of manufacture for a computer-implemented component broker series server for optimized caching of SQL data.

In accordance with the present invention, an object-oriented computer system caches relational data from a relational database in a data cache. The object-oriented computer system has a server that includes an instance manager and that is connected to at least one client. Objects that represent the relational data are created and managed under control of the instance manager. The relational data is stored in the data cache, which includes a virtual memory data cache for each client.

One object of the present invention is to provide data access to a relational database in a multi-threaded, multi-user object server environment. Another object of the present invention is to provide a virtual memory data cache for each client connected to the object server. Yet another object of the present invention is to provide an application profile specifying a caching mode and a prefetch option.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Overview

The present invention operates within an object server environment in which objects are used to represent data in a relational database connected to an object server. One or more clients is connected to the object server. Each client transaction operates on objects, rather than directly on data in the relational database. When a client transaction operates on an object, the object server maps the object data to relational data in the relational database.

The present invention provides multiple virtual memory data caches within an object server. Each client has a corresponding "data cache space" for its transactions. This isolates transactions from different clients without the need to perform object locking. Internally, the present invention maintains a virtual memory data cache for each transaction and uses that virtual memory data cache to store data retrieved from the relational database.

The present invention associates a data access object (DAO) interface with each object. The DAO interface contains a key based pointer that uniquely identifies a view into the relational database and identifies a row in that view using the primary key of the row. The present invention allows reading or writing of column values of rows in the relational database and gives the appearance of working directly against the relational database.

The present invention allows the developer to configure the data cache to perform optimistic or pessimistic caching. In pessimistic caching, data that is retrieved from the relational database remains locked at the relational database. This ensures that the application program is working with current data at the expense of increased concurrency at the relational database. With pessimistic caching, data is refreshed and locked in shared mode at the relational database during each transaction.

In optimistic caching, data is unlocked after reading data from the relational database. This minimizes locking overhead and increases concurrency at the relational database. However the data can change in the relational database while the application program is working on a copy of the data in the data cache. Therefore at the end of a transaction, a compare and update is performed to protect against lost updates. Data that is cached optimistically can remain valid in the data cache beyond the end of a transaction and can be reused by other transactions without being reread from the relational database resulting in increased performance.

A developer can specify a time interval for how long optimistically cached data can be stored and reused in the data cache before needing to be refreshed from the relational database. The data cache provides for automatically performing the refresh function when needed. The data cache tracks the status of all objects and, at the end of a transaction, performs any pending updates, deletes or inserts against the relational database.

The data cache also supports an option for exclusive locking where the data in the relational database is locked for exclusive use. This serializes all access to the data and is intended to reduce deadlocks in situations where several transactions need to update the same data.

The data cache can fetch data for several related objects in a single SQL select statement. This is called data prefetch and makes use of SQL set oriented operations to increase performance.

Finally, the data cache supports configuration options that allow a developer to set a caching mode (i.e., optimistic, pessimistic, or exclusive) and a prefetch option on a transaction basis rather than on a single system wide basis.

Hardware Environment

Figure 1:
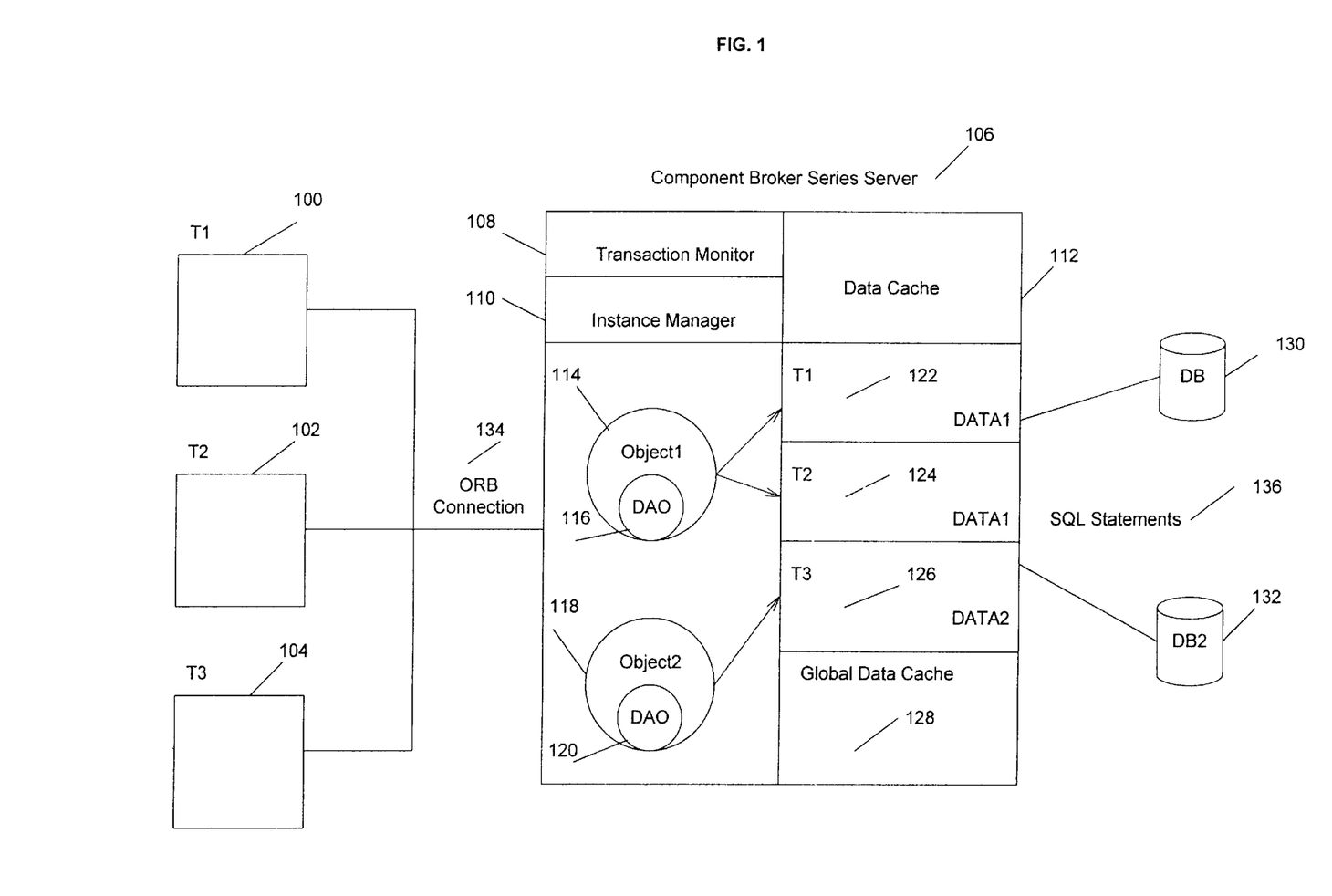
FIG. 1 is a block diagram of an exemplary hardware environment used to implement the preferred embodiment of the present invention.

FIG. 1 is a block diagram of an exemplary hardware environment used to implement the preferred embodiment of the present invention. In the exemplary hardware environment, a client/server architecture is illustrated comprising client computers T1 100, T2 102, and T3 104 coupled to a component broker series (CBS) server computer 106. In the exemplary hardware environment, each client computer 100, 102, and 104 and the CBS server computer 106 may include, inter alia, a processor, memory, keyboard, or display, and may be connected locally or remotely to fixed and/or removable data storage devices and/or data communications devices. Each of the computers 100, 102, 104, and 106 also could be connected to other computer systems via the data communications devices. Those skilled in the art will recognize that any combination of the above components or any number of different components, peripherals, and other devices, may be used with the computers 100, 102, 104, and 106. Those skilled in the art will also recognize that the present invention may be implemented on a single computer, rather than multiple computers networked together.

The present invention is typically implemented using one or more computer programs, each of which executes under the control of an operating system, such as OS/2™, Windows™, Macintosh™, AIX™, UNIX™, DOS™, etc. and causes the computers 100, 102, 104 and 106 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the computers 100, 102, 104 and 106, cause the computers 100, 102, 104 and 106 to perform the steps necessary to implement and/or use the present invention. Under control of the operating system, the computer programs may be loaded from the memory, data storage devices, and/or data communications devices into the memories of the computers 100, 102, 104 and 106 for use during actual operations. Those skilled in the art will recognize many modifications may be made to this configuration without departing from the scope of the present invention.

In the example illustrated in FIG. 1, the present invention includes an object request broker (ORB) connection 134 between the client computers 100, 102, and 104 and the CBS server computer 106. One skilled in the art would recognize that although the present embodiment of the invention is described with the ORB connection, the present invention could be used with other communication protocols between the clients 100, 102, and 104 and the CBS server computer 106. The clients 100, 102, and 104 work with objects 114 and 118 that represent relational data from one of the relational databases 130 and 132 (i.e., datastores) that are connected to the CBS server 106.

The CBS server 106 includes a transaction monitor 108 that assigns transaction identifiers to each transaction received by the CBS server 106 from one of the clients 100, 102, and 104. The CBS server 106 also includes an instance manager 110 that manages the objects 114 and 118 in memory.

Additionally, the CBS server 106 includes a data cache 112. The data cache 112 transfers relational data to and from the relational databases 130 and 132 using SQL statements 136. The data cache 112 includes a virtual memory data cache 122, 124, and 126 for each client T1 100, T2 102, and T3 104, respectively, for holding private data for each client T1 100, T2 102, and T3 104. Moreover, the data cache 112 includes a global data cache 128 for holding shared data. Each virtual memory data cache 122, 124, and 126 contains a copy of the object data for a corresponding transaction. For example, if both clients T1 100 and T2 102 were requesting a transaction on object1 114, then virtual memory data caches 122 and 124 would contain object data for object1 114. Each object 114 and 118 includes a data access object (DAO) interface 116 and 120, which is an interface to the data in the data caches.

When a client T1 100, T2 102, or T3 104 requests a transaction, the client T1 100, T2 102, or T3 104 identifies an object 114 or 118. The DAO interface 116 or 120 associated with the identified object maps the object to a virtual memory data cache. For example, when client T1 100 identifies object1 114, the DAO interface 116 maps object1 114 to virtual memory data cache 122, and when client T2 102 identifies object1 114, the DAO interface 116 maps object1 114 to virtual memory data cache 124.

Component Broker Series Server

The CBS server 106 data cache 112 improves concurrency and optimizes access to relational data stored in a relational database 130 and 132. The CBS server 106 provides an instance manager 110 for managing objects and a data cache 112 for mapping object data to relational data. In particular, the data cache 112 provides virtual memory data caches for each transaction. Additionally, an application profile specifies a caching mode and a prefetch option for use in processing transactions.

The CBS server 106 object model defines objects with user specified attributes that are made persistent in the relational database. The implementation of the object is such that the storage for the attributes is actually allocated in the data cache and the attributes are accessed using the DAO interface 116 or 120. The data cache 112 uses application profile information that describes intended usage patterns of objects by a transaction for an application program. This usage information is used by the data cache 112 to generate optimized SQL and to reuse data that may already be cached in the CBS server 106. The optimization is done at runtime.

The data cache 112 can access relational schema information from the relational database's catalog, along with information that describes the relational view or table that is used to store the object's attributes for each object class. This information, called metadata, is used to describe the structure of data stored in the data cache 112 and to construct the SQL statement or statements used to retrieve or update data between the relational database and the data cache 112.

Each transaction in the CBS server has a virtual memory data cache 122, 124, or 126 and shares one global data cache 128. The private data cache is intended for data that is updated by the transaction or that needs to be pessimistically cached. The global data cache 128 is intended to store data that is optimistically cached and reused across multiple transactions. The DAO interface searches both the virtual memory data cache 122, 124, or 126 and the global data cache 128 in attempting to locate a data cache entry. Therefore, the separation of data cache into a virtual memory data cache 122, 124, or 126 and a global data cache 128 is transparent to a program using the DAO interface 116 or 120.

The data cache 112 manages a collection of data cache entries. Each data cache entry is a data structure described by a SQL table or view. The data values of the data cache entry are accessed using the DAO interface 116 or 120. The data cache entry has a mapping to a relational database 130 and 132 and this mapping is also described by the mapped collection. Values in the data cache entry can be accessed by name or by ordinal number starting at one based on the position of the attribute name in the map type signature of the mapped collection. The ordinal number interface avoids a string lookup and is more efficient.

The data cache 112 includes a data cache manager that is responsible for allocating, deallocating and locating data cache entries and setting and getting attribute values in the data cache entries. The data cache 112 is responsible for transferring data from the relational database 130 and 132 into the data cache 112, transferring updated data from the data cache 112 back to the relational database 130 and 132, maintaining relational database locks, and synchronizing data between the data cache 112 and the relational database 130 and 132. Only updated attributes are transferred from the data cache to the relational database 130 and 132 and updated at the relational database 130 and 132.

The present invention provides the capability to generate object implementations that use the DAO interface 116 or 120. Moreover, the present invention generates metadata used by the DAO interface 116 or 120.

The application profile specifies the initial size of the virtual memory data cache 122, 124, or 126 to allocate for a transaction. This allocation is done when the first reference to the data cache occurs during a transaction. An increment size and a maximum size are also be specified in the application profile. The application profile also specifies the data cache size for the global data cache 128. The global data cache 128 contains optimistically cached data that can be reused by multiple transactions. In particular, an initial size, an increment amount, and a maximum size are specified for the global data cache 128.

The application profile also specifies the maximum size of the data cache 112. If the data cache 112 becomes full, additional memory is allocated until the data cache 112 reaches its maximum size. When additional memory is allocated, data that has been read into the data cache 112, but which has not been updated, is discarded from the data cache 112. If additional memory can not be allocated, an exception is generated.

Processing A Transaction

Figure 2:
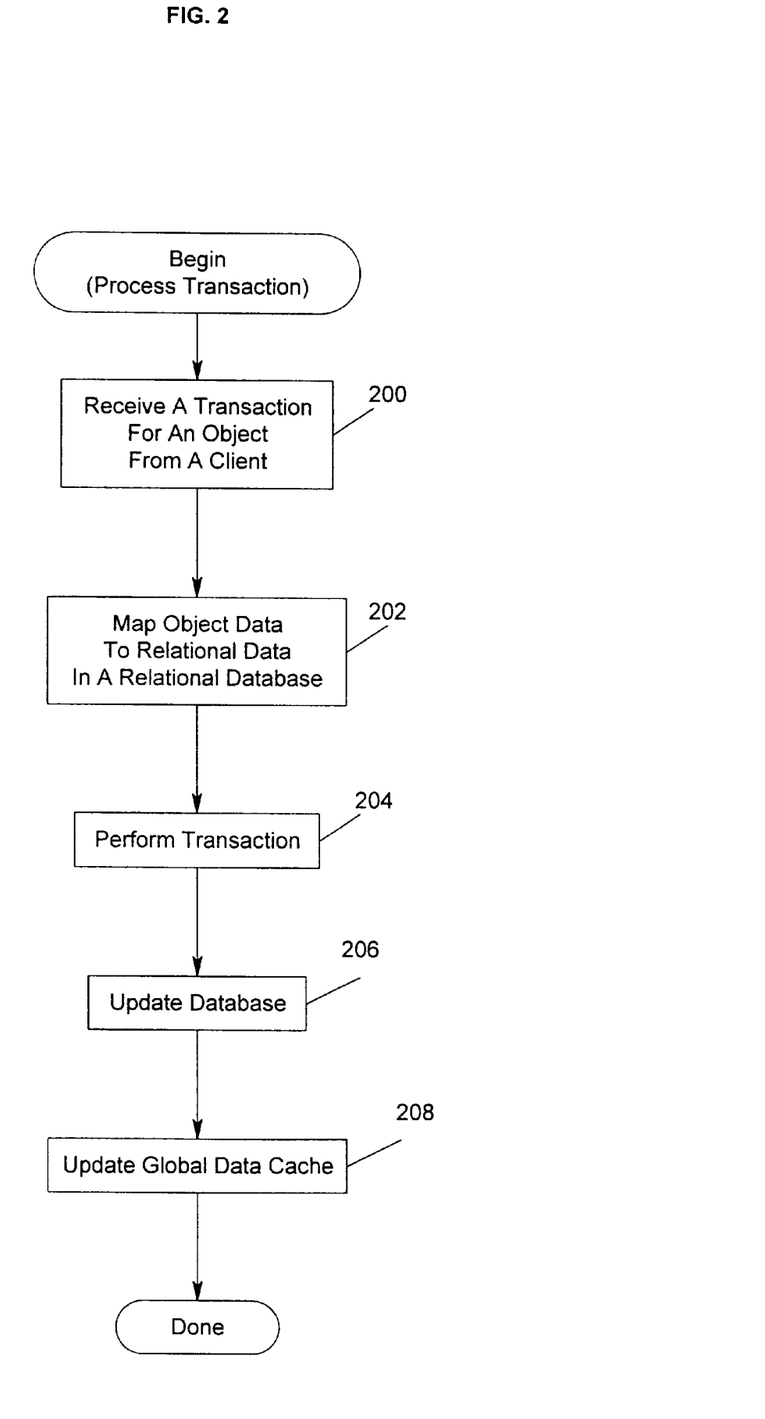
FIG. 2 is a flow diagram illustrating the steps that are performed to process a transaction.

FIG. 2 is a flow diagram illustrating the steps that are performed to process a transaction. Block 200 represents the CBS server 106 receiving a transaction to be performed on an object 114 or 118 from a client 100, 102, or 104. Block 202 represents the CBS server 106 mapping object data to relational data in a relational database. Block 204 represents the CBS server 106 performing the transaction. Block 206 represents the CBS server 106 updating the database.

Block 208 represents the CBS server 106 updating the global data cache 128. At the termination of a transaction with commit, the CBS server 106 moves any data that is cached optimistically in a virtual memory data cache 122, 124, or 126, to the global data cache 128, provided that the global data cache 128 does not already contain a more recent copy of the same data and the refresh interval specified in the application profile for this data has not expired. The virtual memory data cache 122, 124, or 126 is then deleted. Moreover, at the termination of a transaction that aborts, the virtual memory data cache 122, 124, or 126 for that transaction is deleted.

Mapping Object Data

Figure 3:
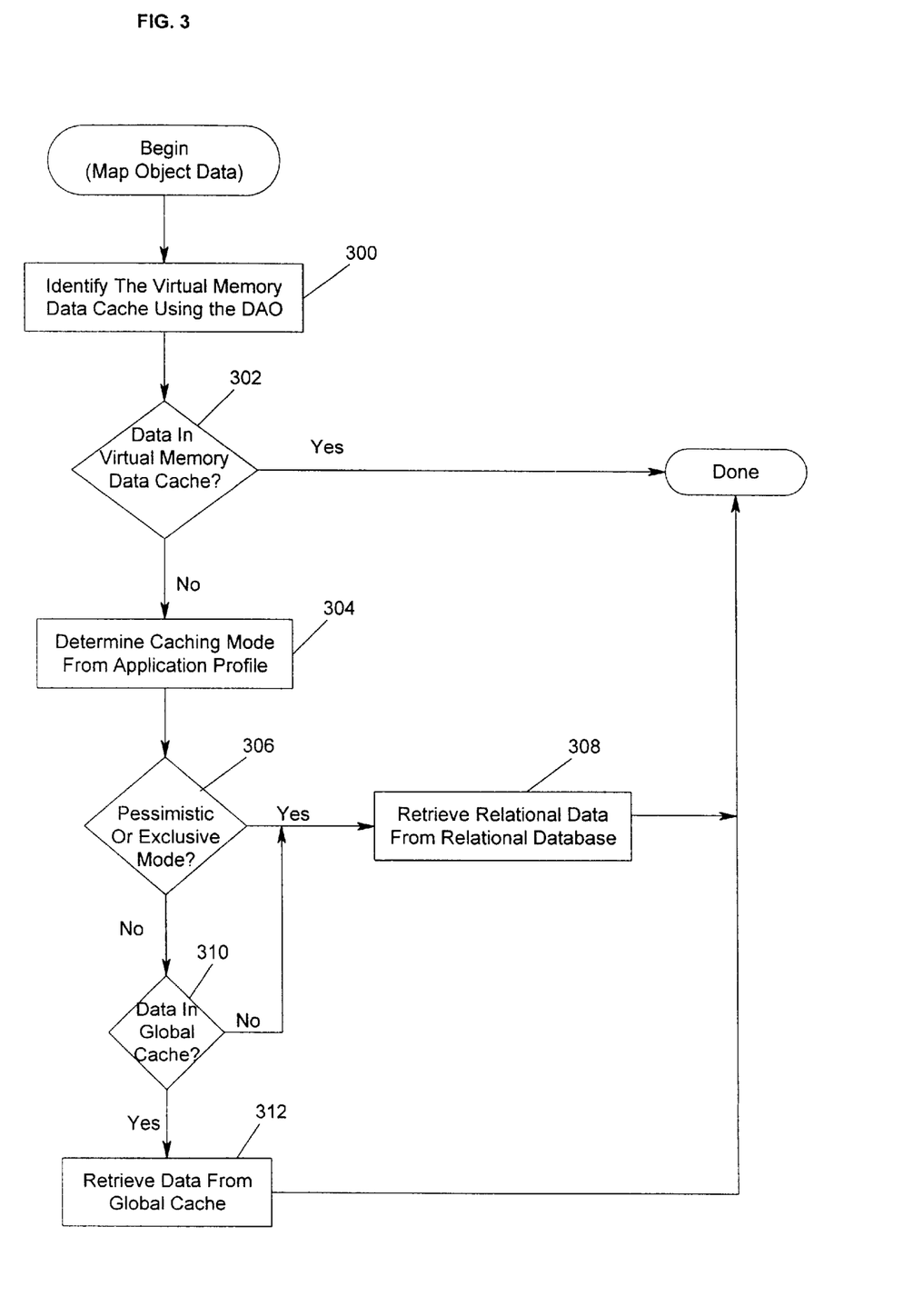
FIG. 3 is a flow diagram illustrating the steps that are performed to map object data to relational data.

FIG. 3 is a flow diagram illustrating the steps that are performed to map object data to relational data. Block 300 represents the CBS server 106 identifying a virtual memory data cache 122, 124, or 126 for a transaction using the DAO interface 116 or 120.

The data cache 112 is packaged as an object service dynamic link library (DLL) which is loaded and initialized by a runtime server. The data cache service DLL provides an entry point for initialization. Each transaction that uses the data cache 112 operates on a private copy of data retrieved from a relational database 130 and 132 and stored in a virtual memory data cache 122, 124, or 126. Since each transaction has a private copy of state data, there is less need for object locking and contention for object locks by transactions. The end result is a CBS server 106 with better scalability.

The DAO interface 116 or 120 uses an optimized hash lookup to find the virtual memory data cache 122, 124, or 126 for the current transaction and the view and row contained in that virtual memory data cache 122, 124, or 126. Before a DAO interface 116 or 120 can be used, the collection name and the key of the DAO interface 116 or 120 is set. There are two interfaces for setting the key. The setKey method takes the key as a binary string. The setKeyAttributes method takes the key as a sequence of attribute values. The key can also be specified using attribute names with the setKeyByName method. The collection name can be specified using the setMap method.

Block 302 represents the CBS server 106 determining whether the data required for the transaction is already in the identified virtual memory data cache 122, 124, or 126. If the data is in the virtual memory data cache 122, 124, or 126, then the transaction is performed in Block 204. If the data is not in the virtual memory data cache 122, 124, or 126, Block 304 represents the CBS server 106 determining the caching mode to use from the application profile.

Performance of the data cache 112 is influenced by the application profile. Typically, a single application profile is defined for the CBS server 106 and applies to all cached data. However, different application profiles can be used by different transactions. The application profile contains a class profile list which is a list of object class names and contains the type of caching mode (optimistic, pessimistic, or exclusive) that is to be used for each class name by the data cache service. There is also a default class profile with a null class name. When determining the data caching mode to apply to a particular object class, if the class name does not appear in the class profile list, then the default class profile is used.

In addition to the caching mode (optimistic, pessimistic, or exclusive) the application profile also describes the access intent for each object class name. The access intent can be specified as READ for read only access, UPGRADE for read and write access, or WRITE for exclusive access. The access intent is used together with the caching mode to determine the type of relational database locking to use and whether to store the data cache entry in the global data cache 128 or a virtual memory data cache 122, 124, or 126.

When data is retrieved from the relational database 130 and 132 and stored in the data cache, there are three caching modes which control the coordination of the data cache and the relational database 130 and 132. In a pessimistic caching mode, the data is read with either RR (repeatable read) or RS (read stability) locking at the relational database 130 and 132. If the access intent of the data is READ or UPGRADE, then a shared lock is obtained on the data in the relational database 130 and 132. If WRITE access is required for the data, then an intent update or exclusive lock is acquired at the relational database 130 and 132. When the transaction commits, relational database locks are released by the commit operations, and data cached under a pessimistic caching mode is marked invalid. If this data is referenced again in another transaction, the data is retrieved and locked again from the relational database 130 and 132.

The decision as to whether to use RR or RS is made at installation time. The data cache 112 supplies two DB2 packages that are bound to all target relational databases. One package is used for optimistic caching and another for pessimistic caching. The package used for optimistic caching contains the CS bind option. The package used for pessimistic caching contains the RS bind option. At install time, the system developer can override and change the RS bind option to RR.

Pessimistic caching provides full isolation among transactions. However pessimistic caching results in low concurrency since any data touched is retrieved from the relational database 130 and 132 and locked in a shared mode until the end of the transaction.

Optimistic caching results in greater concurrency since data is only locked for the duration of the read operation. Optimistic caching also uses a copy of the data from the global data cache 128, if possible, to avoid a retrieve from the relational database 130 and 132. Optimistic caching still guarantees no lost updates or dirty reads, however optimistic caching does not guarantee isolation among transactions to the extent that pessimistic caching does. Application programs that perform updates based upon the results of reading optimistically locked data must do so with careful regards to data integrity. Data cached optimistically is not marked invalid after a commit and can be stored in the global data cache 128 and can be reused by other transactions.

With an optimistic caching mode, data is retrieved from the relational database 130 and 132 using CS (cursor stability) locking. This locks data only for the duration of the retrieve operation. The data in the relational database 130 and 132 can change, and the cached data can be out of date.

When specifying an optimistic data caching mode, a time duration is also specified that controls how often the data cache is refreshed. As long as the data does not remain in the data cache 112 longer than the time duration, the cached data is reused by transactions. When the data does remain in the data cache 112 longer than the time duration, the cached data is refreshed from the relational database 130 and 132 at the beginning of the next transaction that references the data. An explicit refresh application programming interface (API) is also available on the DAO interface 116 or 120. The explicit refresh is uses to cause a refresh of the data cache entry to occur regardless of the time duration.

The type of data caching mode to use for an application program is specified through the application profile. The application program can specify a caching mode per object type and a default caching mode that covers object_types not otherwise specified. There can be one application profile that applies to all cached data, or there can be multiple application profiles, with each client specifying an application profile to use for data in its virtual memory data cache 122, 124, or 126.

Block 306 represents the CBS server 106 determining whether the caching mode is pessimistic or exclusive. When the caching mode is pessimistic or exclusive, Block 308 represents the CBS server 106 retrieving data from the relational database and storing the data in the identified virtual memory data cache 122, 124, or 126.

Block 310 represents the CBS server 106 recognizing that the caching mode is optimistic and then performing a lookaside to determine whether the data is in the global data cache. When object queries are executed and rewritten into SQL, before being pushed down to the relational database 130 and 132, the data cache 112 provides a data cache lookaside function. This lookaside function allows a data cache lookup by primary or alternate key. If SQL queries are used to implement object navigation, the data cache lookaside provides improved performance on SQL queries that contain predicates on a primary data key or a foreign data key.

When the data is not in the global data cache 128, Block 308 represents the CBS server 106 retrieving data from the relational database. When the data is in the global data cache 128, Block 312 represents the CBS server 106 retrieving data from the global data cache 128 and storing the data in the identified virtual memory data cache 122, 124, or 126.

Retrieving Relational Data

Figure 4:
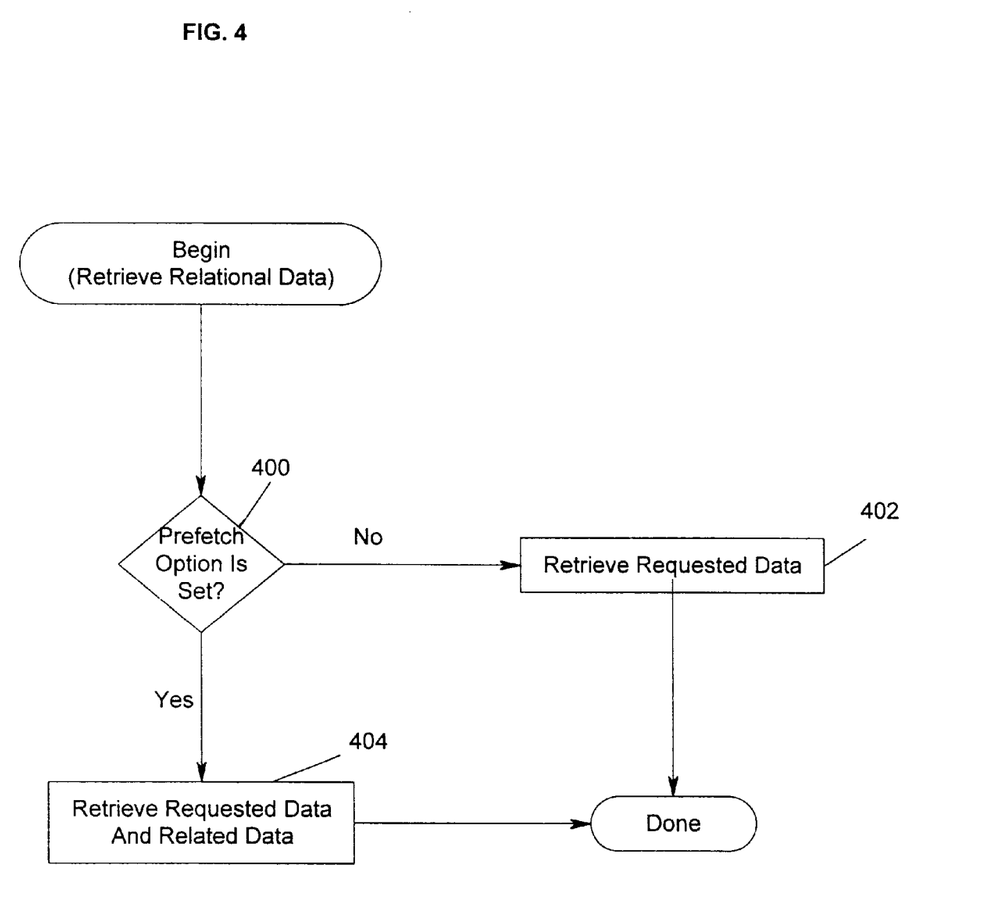
FIG. 4 is a flow diagram illustrating the steps that are performed to retrieve relational data from a relational database.

FIG. 4 is a flow diagram illustrating the steps that are performed to retrieve relational data from a relational database 130 and 132. Block 400 represents the CBS server 106 determining whether a prefetch option is set in the application profile.

The prefetch option allows a developer or administrator responsible for system tuning to specify a clustering among related object types. Whenever an object is activated by a primary key, the data for the activated object along with the data for the related object instances is read from the relational database 130 and 132 into the data cache 112 in a single retrieve operation. This reduces the number of retrieve operations performed against the relational database 130 and 132. The SQL join operator is used to retrieve data for multiple related object instances in a single SQL select statement.

The object clustering is specified via a prefetch option that is specified either at runtime through the application profile interface or by an administrator specifying a prefetch option as part of an application profile stored in the common datastore (CDS).

If the prefetch option is not set, Block 402 represents the CBS server 106 retrieving the requested data from the relational database 130 and 132. If the prefetch option is set, Block 402 represents the CBS server 106 retrieving the requested data and related data from the relational database 130 and 132.

The data cache 112 uses SQL requests to obtain data from the relational databases 130 and 132. The data cache 112 uses the DB2 embedded SQL interface. The data cache 112 relies on the instance manager 110 to create appropriate connections to DB2 relational databases 130 and 132 and to manage DB2 transaction contexts.

Updating The Relational Database

Figure 5:
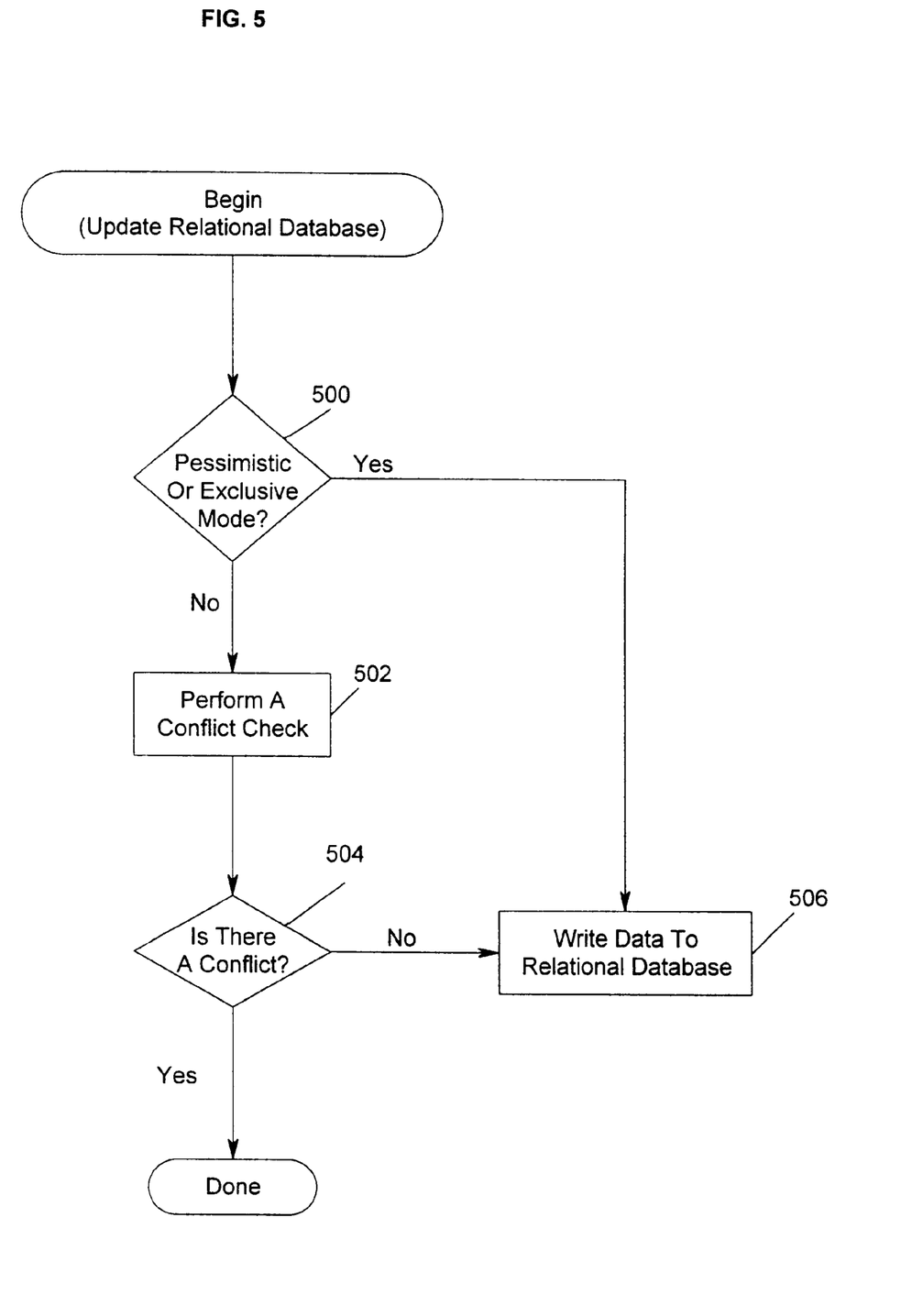
FIG. 5 is a flow diagram illustrating the steps that are performed to update the relational database.

FIG. 5 is a flow diagram illustrating the steps that are performed to update the relational database 130 and 132. Block 500 represents the CBS server 106 determining whether the caching mode is pessimistic or exclusive. When the caching mode is pessimistic or exclusive, Block 506 represents the CBS server 106 writing data to the relational database 130 and 132.

When the caching mode is optimistic, Block 502 represents the CBS server 106 performing a conflict check. The data cache 112 gathers updates to the relational database 130 and 132 and reorders and executes them in an efficient manner. For example, if the parent row in the relational database 130 and 132 is deleted and the delete cascades to the child rows, the data cache 112 deletes the child rows.

When a data cache entry with optimistic caching is updated and this update is applied to the relational database 130 and 132, it is possible that the update is not valid because the data cache entry is out of date. To prevent data integrity problems and lost updates the data cache keeps track of both the old and new values for the data cache entry. When updates are performed, the data values in the relational database 130 and 132 are compared to the old values and only if they are equal, the new values are applied.

When optimistically cached data is updated and the update is propagated back to the relational database 130 and 132, for all updated attributes except long fields (fields greater than 255 bytes in length), the original data cache value is compared with a current relational database value. This comparison determines whether the relational database value has been updated since the data cache entry was last read. If the comparison is successful, then the update occurs. If the comparison is not successful, then the update does not occur.

The comparison is done by using additional predicates on the SQL UPDATE statement to perform the comparison and update. The above limitation on long fields comes from the fact that the SQL equal predicate does not work on long fields types. If an application program does have long fields, then the application program should make sure that at least one other non-long field is updated. A typical example is to have a timestamp field in the relational database record that is set to date and time of last update. The timestamp field is updated if any other field, including any long fields are updated. When the relational database 130 and 132 is updated from the data cache entry the timestamp field is used for conflict resolution because it has also been updated.

When updates are made to a data cache entry, the updates are not normally propagated immediately to the relational database 130 and 132. The relational database 130 and 132 update occurs either at commit, or when the application program issues a DAO::updateImmediate ( ) call.

If an application program wants to get immediate feedback from the relational database 130 and 132, the application program specifies an immediate update policy. The immediate update policy is typically used when the relational database 130 and 132 has various constraints defined and an application program wants to know whether its update passes the constraint checking. If the updates are deferred until commit, this may be too late for the application program to perform any error recovery. For the application program to get immediate feedback on the validity of its updates, it may designate certain object_types to use the immediate update policy. This is specified in the application profile. An alternative would be for the application program to use a deferred update policy, but to selectively issue the DAO::updateImmediate ( ) call to force an update to the relational database 130 and 132 prior to commit.

The immediate update policy results in a relational database 130 and 132 update whenever a set attribute call occurs to a data cache entry or the data cache entry is marked DELETED. When creating a new object instance, a series of sets occur for all the attributes before the insert occurs. To perform an insert before all the attributes have been set would in general cause an error at the relational database 130 and 132 unless all attributes have been defined as nullable columns. Therefore, if the data cache entry has been created with a status of NEW, the insert takes place only on a DAO::updateImmediate ( ) call or a commit regardless of whether a deferred or immediate update policy is being used.

When there is no conflict, Block 506 represents the CBS server 106 writing data to the relational database 130 and 132. When there is a conflict, the update is aborted and data is not written to the relational database 130 and 132.

Conclusion

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A method in an object-oriented computer system for caching relational data from a relational database in a data cache, the object-oriented computer system having a server including an instance manager and connected to at least one client, the method comprising the steps of:

creating and managing objects that represent the relational data under control of the instance manager; and storing the relational data in the data cache, wherein the data cache includes a virtual memory data cache for each client and a shared global data cache for lookaside functions.

2. A method in an object-oriented computer system for caching relational data from a relational database in a data cache, the object-oriented computer system having a server including an instance manager and connected to at least one client, the method comprising the steps of:

creating and managing objects that represent the relational data under control of the instance manager; and storing the relational data in the data cache, wherein the data cache includes a virtual memory data cache for each client and wherein each object includes a data access object interface, further comprising, under control of the data access object interface, using a transaction identifier generated by a transaction monitor to identify the virtual memory data cache for each client.

3. A method in an object-oriented computer system for caching relational data from a relational database in a data cache, the object-oriented computer system having a server including an instance manager and connected to at least one client, the method comprising the steps of:

creating and managing objects that represent the relational data under control of the instance manager; and storing the relational data in the data cache, where the data cache includes a virtual memory data cache for each client and wherein the data cache includes a global data cache for lookaside functions in an optimistic data caching mode.

4. The method of claim 1 above, wherein the data cache can operate in an optimistic mode, a pessimistic mode, or an exclusive mode.

5. The method of claim 1 above, wherein the data cache includes an expiration time interval for purging data from the data cache in an optimistic mode.

6. The method of claim 1 above, wherein, in a pessimistic mode, the relational database is locked in a shared mode and is readable by multiple transactions.

7. The method of claim 1 above, wherein, in an exclusive mode, the relational database is exclusively locked and is readable by one transaction.

8. The method of claim 1 above, further comprising:

retrieving data from the relational database represented by an object; and prefetching data from the relational database that is related to the retrieved data.

9. The method of claim 1 above, further comprising an application profile specifying a data caching mode and a pre-fetch option.

10. The method of claim 1 above, further comprising multiple application profiles, with each transaction selecting an application profile.

11. An apparatus for caching relational data from a relational database in a data cache, comprising:

an object-oriented computer system having a server that includes an instance manager and that is connected to at least one client; and one or more computer programs, performed by the computer, for creating and managing objects that represent the relational data under control of the instance manager, and for storing the relational data in the data cache, wherein the data cache includes a virtual memory data cache for each client and a shared global data cache for lookaside functions.

12. An apparatus for caching relational data from a relational database in a data cache, comprising:

an object-oriented computer system having a server that includes an instance manager and that is connected to at least one client; and one or more computer programs, performed by the computer, for creating and managing objects that represent the relational data under control of the instance manager, and for storing the relational data in the data cache, wherein the data cache includes a virtual memory data cache for each client and wherein each object includes a data access object interface, further comprising means for, under control of the data access object interface, using a transaction identifier generated by a transaction monitor to identify the virtual memory data cache for each client.

13. An apparatus for caching relational data from a relational database in a data cache, comprising:

an object-oriented computer system having a server that includes an instance manager and that is connected to at least one client; and one or more computer programs, performed by the computer, for creating and managing objects that represent the relational data under control of the instance manager, and for storing the relational data in the data cache, wherein the data cache includes a virtual memory data cache for each client and wherein the data cache includes a global data cache for lookaside functions in an optimistic data caching mode.

14. The apparatus of claim 11 above, wherein the data cache can operate in an optimistic mode, a pessimistic mode, or an exclusive mode.

15. The apparatus of claim 11 above, wherein the data cache includes an expiration time interval for purging data from the data cache in an optimistic mode.

16. The apparatus of claim 11 above, wherein, in a pessimistic mode, the relational database is locked in a shared mode and is readable by multiple transactions.

17. The apparatus of claim 11 above, wherein, in an exclusive mode, the relational database is exclusively locked and is readable by one transaction.

18. The apparatus of claim 11 above, further comprising:
   means for retrieving data from the relational database represented by an object; and
   means for prefetching data from the relational database that is related to the retrieved data.

19. The apparatus of claim 11 above, further comprising an application profile specifying a data caching mode and a pre-fetch option.

20. The apparatus of claim 11 above, further comprising multiple application profiles, with each transaction selecting an application profile.

21. An article of manufacture comprising a program storage medium readable by an object-oriented computer system and embodying one or more instructions executable by the object-oriented computer system to perform method steps for caching relational data from a relational database in a data cache, the object-oriented computer system having a server including an instance manager and connected to at least one client, the method comprising the steps of:
   creating and managing objects that represent the relational data under control of the instance manager; and
   storing the relational data in the data cache, wherein the data cache includes a virtual memory data cache for each client and a shared global data cache for lookaside functions.

22. An article of manufacture comprising a program storage medium readable by an object-oriented computer system and embodying one or more instructions executable by the object-oriented computer system to perform method steps for caching relational data from a relational database in a data cache, the object-oriented computer system having a server including an instance manager and connected to at least one client, the method comprising the steps of:
   creating and managing objects that represent the relational data under control of the instance manager; and
   storing the relational data in the data cache, wherein the data cache includes a virtual memory data cache for each client and wherein each object includes a data access object interface, further comprising, under control of the data access object interface, using a transaction identifier generated by a transaction monitor to identify the virtual memory data cache for each client.

23. An article of manufacture comprising a program storage medium readable by an object-oriented computer system and embodying one or more instructions executable by the object-oriented computer system to perform method steps for caching relational data from a relational database in a data cache, the object-oriented computer system having a server including an instance manager and connected to at least one client, the method comprising the steps of:
   creating and managing objects that represent the relational data under control of the instance manager; and
   storing the relational data in the data cache, wherein the data cache includes a virtual memory data cache for each client and wherein the data cache includes a global data cache for lookaside functions in an optimistic data caching mode.

24. The method of claim 21 above, wherein the data cache can operate in an optimistic mode, a pessimistic mode, or an exclusive mode.

25. The method of claim 21 above, wherein the data cache includes an expiration time interval for purging data from the data cache in an optimistic mode.

26. The method of claim 21 above, wherein, in a pessimistic mode, the relational database is locked in a shared mode and is readable by multiple transactions.

27. The method of claim 21 above, wherein, in an exclusive mode, the relational database is exclusively locked and is readable by one transaction.

28. The method of claim 21 above, further comprising:
   retrieving data from the relational database represented by an object; and
   prefetching data from the relational database that is related to the retrieved data.

29. The method of claim 21 above, further comprising an application profile specifying a data caching mode and a pre-fetch option.

30. The method of claim 21 above, further comprising multiple application profiles, with each transaction selecting an application profile.

* * * * *